United States Patent [19]

Mazzotta, Sr.

[11] Patent Number: 5,003,756
[45] Date of Patent: Apr. 2, 1991

[54] DOG GARMENT WITH FLEA REPELLING MEANS

[76] Inventor: Joseph A. Mazzotta, Sr., 1970 Lawnridge St., Medford, Oreg. 97504

[21] Appl. No.: 490,445

[22] Filed: Mar. 8, 1990

[51] Int. Cl.⁵ ............................................. B68C 5/00
[52] U.S. Cl. ...................................... 54/79; 119/156
[58] Field of Search ................ 119/96, 143, 156; 54/79

[56] References Cited

U.S. PATENT DOCUMENTS

| | | | |
|---|---|---|---|
| 1,560,683 | 11/1925 | Foley . | |
| 1,562,318 | 11/1925 | Erlandson | 119/156 |
| 2,408,575 | 10/1946 | Norvig | 119/156 |
| 2,688,311 | 9/1954 | Pierce | 119/156 |
| 2,850,860 | 5/1955 | Torell et al. | 54/79 |
| 3,248,852 | 5/1966 | Schwartz | 54/79 |
| 3,839,845 | 10/1974 | Hickey | 54/79 |
| 4,141,322 | 2/1979 | Evans et al. | 119/156 X |
| 4,184,452 | 1/1980 | Buzzell et al. | 119/156 X |
| 4,355,600 | 10/1982 | Zielinski | 119/143 |
| 4,852,517 | 8/1989 | Smith | 119/1 |

*Primary Examiner*—Robert P. Swiatek
*Attorney, Agent, or Firm*—Eugene M. Eckelman

[57] ABSTRACT

A dog coat is provided of a size which is arranged to cover the chest and a portion of the neck as well as the sides and back. The coat has an inner surface provided with flea repelling strips removably mounted in lines of cross loops which provide for replacement of the strips and also which provide good exposure of the strips to the dog.

1 Claim, 1 Drawing Sheet

DOG GARMENT WITH FLEA REPELLING MEANS

BACKGROUND OF THE INVENTION

This invention relates to new and useful improvements in flea repelling means for dogs.

Flea collars have heretofore been provided for the purpose of repelling fleas on dogs. These collars appear to be successful in keeping the fleas off the dog's back and head but have not been successful in keeping the fleas entirely off the dog. With the use of a flea collar, the fleas merely migrate to other portions of the dog and particularly to those portions where the dog has difficulty in scratching or biting.

SUMMARY OF THE INVENTION

According to the present invention and forming a primary objective thereof, flea repelling means are provided for dogs which provides a substantial improvement in structure for keeping fleas off the entire body of the dog.

A more particular object is to provide a device of the type described in the form of a coat for a dog which has holders for flea repelling strips at preselected places.

Still another object is to provide a device of the type described that utilizes conventional flea repelling strips.

In carrying out the objectives of the invention, a dog coat is provided which has a size arranged to cover the chest of the dog and a portion of the neck and also the sides and back. The coat has an inner surface which supports flea repelling means in the form of elongated strips. A plurality of these strips are utilized and each is supported in holders comprising a plurality of cross loops, the loops being in alignment and arranged to removably hold one or more of the strips. The loops in each line are spaced from each other to adequately expose the strip to the dog.

The invention will be better understood and additional objects and advantages will become apparent from the following description taken in connection with the accompanying drawings.

DETAILED DESCRIPTION OF A PREFERRED EMBODIMENT

Figure 1:
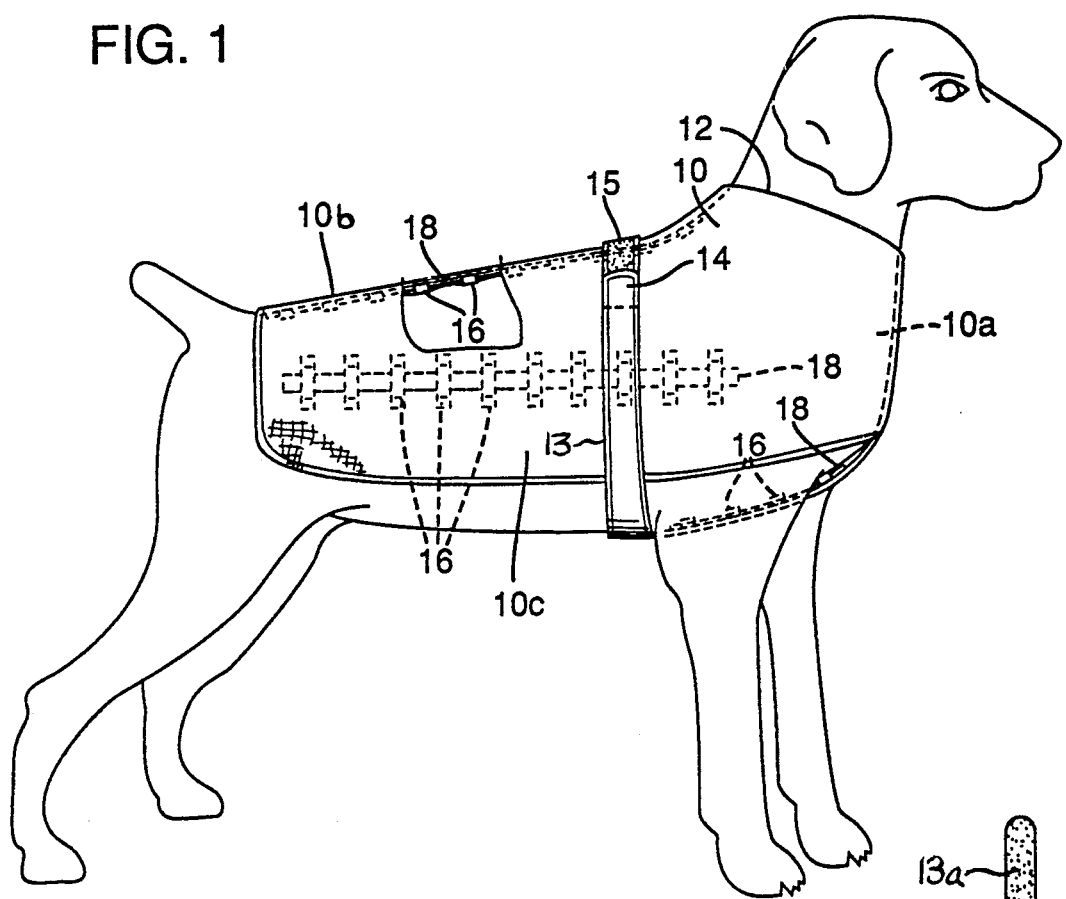
FIG. 1 is a perspective view of a dog garment with flea repelling means, the garment being shown in place on a dog.
Figure 2:
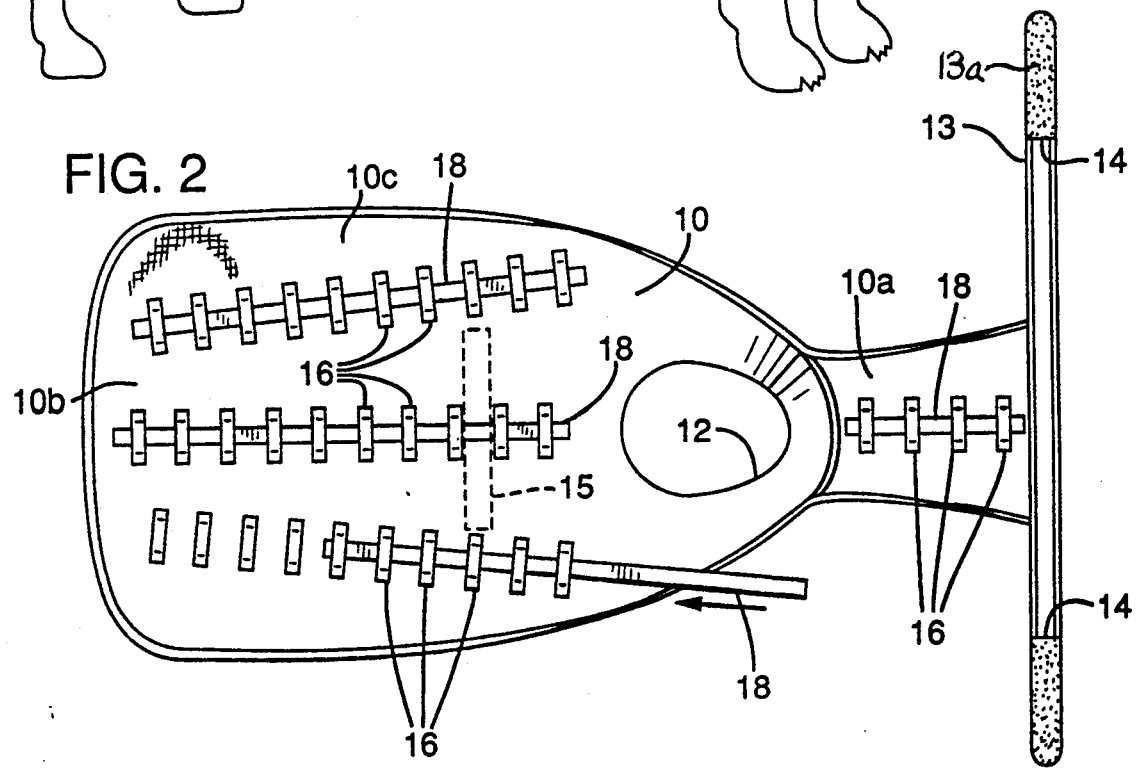
FIG. 2 is a plan view of the under surface of the garment comprising the surface that supports flea repelling strips.

The garment comprises a coat 10 having a chest and neck portion 10a, a back portion 10b and side portions 10c. An opening 12 is provided for receiving the head. The chest portion 10a extends downwardly between the front legs and has tie straps 13 that encircle a forward portion of the dog behind the front legs and connect, by suitable connecting means 14, at the top. These connecting means may be of a type sold under the trademark "Velcro". Preferably, as shown, a short strip 15 of this connecting material is sewn exteriorly in center position over the back and the connecting means 13a are capable of being attached thereto at the sides. Such attachment can adjust to different size dogs.

The under surface of the coat may be suitably lined as desired. According to the invention, this surface has loops 16 secured thereto which support flea strips 18 at preselected places. A good choice for the strips is up the chest and neck area and longitudinally along the back and sides. These strips may have other suitable locations.

Each strip 18 is supported by a plurality of the loops 16 with several loops being provided for each strip. These loops are in alignment for ease in sliding the strips into place. The loops are of a size to provide a frictional engagement with the flea strips so that they will stay in place under normal circumstances but can be replaced. The loops for each strip are spaced from each other so that the flea strip will have good exposure to the dog.

With the use of the present coat, the dog will be rid of fleas since the flea strips can be located at those points where fleas generally congregate. In the present instance, the multiple flea strips completely rid the dog of fleas, or if a flea survives by migrating to a distant point of the dog, the dog can reach him by scratching or biting.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A dog garment comprising:

a coat having a size arranged to cover the chest of the dog and a portion of the neck and also to cover the sides and back of the dog, means on said coat arranged to hold it in place on a dog, said coat having an inner surface in engagement with the body of the dog, and a plurality of elongated flea repelling strips and a plurality of holders for said flea strips mounted on the inner surface of said coat and each including a plurality of cross loops, said loops for each strip being in alignment and arranged to removably hold one of said strips, said loops being spaced from each other to expose said strip to the dog.

* * * * *